United States Patent
Janjic et al.

(10) Patent No.: US 11,399,137 B2
(45) Date of Patent: Jul. 26, 2022

(54) OBJECT-TRACKING SYSTEM

(71) Applicant: Aurora Flight Sciences Corporation, Manassas, VA (US)

(72) Inventors: Igor Janjic, Malden, MA (US); Jae-Woo Choi, Lexington, MA (US); Franklin Wu, Watertown, MA (US)

(73) Assignee: Aurora Flight Sciences Corporation, Manassas, VA (US)

( * ) Notice: Subject to any disclaimer, the term of this patent is extended or adjusted under 35 U.S.C. 154(b) by 0 days.

(21) Appl. No.: 16/100,533

(22) Filed: Aug. 10, 2018

(65) Prior Publication Data
US 2020/0053292 A1    Feb. 13, 2020

(51) Int. Cl.
| H04N 5/232 | (2006.01) |
| G06T 7/277 | (2017.01) |
| G06T 7/70 | (2017.01) |
| G01C 21/12 | (2006.01) |
| G01S 19/49 | (2010.01) |
| G01S 19/51 | (2010.01) |

(52) U.S. Cl.
CPC ......... *H04N 5/23299* (2018.08); *G01C 21/12* (2013.01); *G01S 19/49* (2013.01); *G01S 19/51* (2013.01); *G06T 7/277* (2017.01); *G06T 7/70* (2017.01); *G06T 2207/30244* (2013.01)

(58) Field of Classification Search
None
See application file for complete search history.

(56) References Cited

U.S. PATENT DOCUMENTS

| 4,063,073 A | 12/1977 | Strayer |
| 5,157,615 A | 10/1992 | Brodegard et al. |
| 6,604,044 B1 | 8/2003 | Kirk |
| 6,820,006 B2 | 11/2004 | Patera |
| 7,106,219 B2 | 9/2006 | Pearce |
| 7,176,830 B2 | 2/2007 | Horibe |
| 7,650,232 B1 | 1/2010 | Paielli |
| 8,049,658 B1 | 11/2011 | Lagonik et al. |

(Continued)

OTHER PUBLICATIONS

J. Hightower, R. Want, G. Borriello: "SpotON: An Indoor 3D Location Sensing Technology Based on RF Signal Strength," UW CSE 00-02-02, University of Washington, Department of Computer Science and Engineering, Seattle, WA, 16 pages, Feb. 2000.

(Continued)

*Primary Examiner* — Kaitlin A Retallick
(74) *Attorney, Agent, or Firm* — Michael Stanley Tomsa; McAndrews, Held & Malloy, Ltd.; Eugene H. Nahm

(57) ABSTRACT

An object-tracking system is disclosed. The tracking system is designed for environments where global positioning system (GPS), radio frequency (RF), and/or cellular communication signals are unavailable. The system is configured to use camera-captured images of the surrounding environment in conjunction with inertial measurements to perform visual and/or traditional odometry. An object detection algorithm and/or tracking scheme may be used to detect objects within the captured images, to help determine a user position relative to the objects. The detector architecture may be configured to allow for target (and/or object) agnostic camera detection and/or tracking that is easily configurable and/or reconfigurable depending on for the type of object to be detected and/or tracked.

20 Claims, 5 Drawing Sheets

(56) References Cited

U.S. PATENT DOCUMENTS

| | | | |
|---|---|---|---|
| 8,306,672 | B2 | 11/2012 | Nickolaou |
| 8,346,480 | B2 | 1/2013 | Trepagnier et al. |
| 8,373,751 | B2 | 2/2013 | Han et al. |
| 8,411,145 | B2 | 4/2013 | Fardi |
| 8,466,827 | B2 | 6/2013 | Nanami |
| 9,052,393 | B2 | 6/2015 | Kriel et al. |
| 9,097,801 | B2 | 8/2015 | Kambe et al. |
| 9,507,021 | B2 | 11/2016 | Lynam |
| 2002/0030741 | A1* | 3/2002 | Broemmelsiek ........ G01S 5/16 348/172 |
| 2006/0078162 | A1* | 4/2006 | Wonneberger ..... H04N 5/23258 348/208.99 |
| 2009/0128618 | A1* | 5/2009 | Fahn ................. G06V 10/22 348/E7.001 |
| 2010/0165114 | A1* | 7/2010 | Goh ..................... H04N 5/772 348/169 |
| 2012/0081552 | A1* | 4/2012 | Sablak ............. H04N 5/23299 348/169 |
| 2012/0233000 | A1* | 9/2012 | Fisher .................. G06F 16/78 705/14.71 |
| 2015/0243069 | A1* | 8/2015 | Knoblauch .......... G06T 11/001 345/420 |
| 2016/0055673 | A1 | 2/2016 | Broaddus et al. |
| 2016/0327395 | A1* | 11/2016 | Roumeliotis ............ G06T 7/20 |
| 2017/0217434 | A1 | 8/2017 | Halder et al. |
| 2019/0005361 | A1* | 1/2019 | Cho ..................... G06V 10/82 |
| 2019/0156138 | A1* | 5/2019 | Ju ........................ G06V 10/40 |
| 2019/0294889 | A1* | 9/2019 | Sriram ................ G06V 20/584 |

OTHER PUBLICATIONS

R. Landaua, G. K. Auslandera, S. Wernera, N. Shovalb and J. Heinik, "Who should make the decision on the use of GPS for people with dementia?" Aging & Mental Health, vol. 15, No. 1, Jan. 2011, 78-84.

M. Li, A.I. Mourikis: "High-Precision, Consistent EKF-based Visual-Inertial Odometry," International Journal of Robotics Research, 32(6), pp. 690-711, 2013.

M. Li, A.I. Mourikis: "Online Temporal Calibration for Camera-IMU Systems: Theory and Algorithms," The International Journal of Robotics Research, vol. 33 issue: 7, pp. 947-964, Jun. 1, 2014.

Partial European search report for EU application No. 19190684.1, dated Nov. 28, 2019.

The extendeed European search report for EU application No. 19190684.1, dated Mar. 5, 2020.

The examination report for EU application No. 19190684.1, dated Nov. 25, 2020, European Patent Office, Germany (7 pages).

Summons to attend oral proceedings pursuant to Rule 115(1) EPC, dated Sep. 29, 2021, for EU application No. 19190684.1, European Patent Office, Germany (16 pages).

Israel Notice of Deficiencies for Patent Application 268219, dated Mar. 15, 2022, Department of Justice, Patent Office, Jerusalem (4 pages).

* cited by examiner

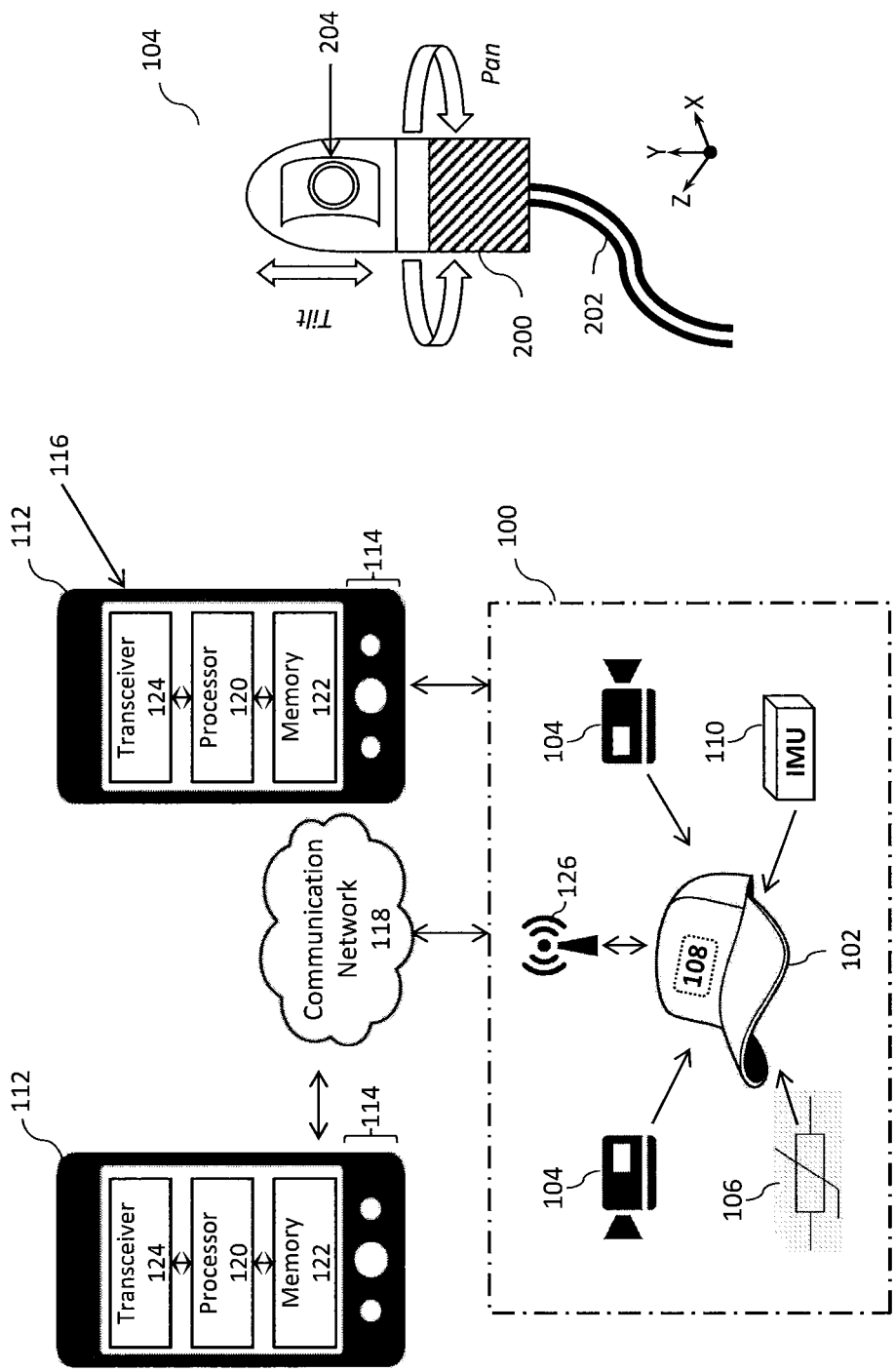

OBJECT-TRACKING SYSTEM

FIELD

The present disclosure relates to an object-tracking system, and more particularly to object-tracking systems designed for environments where global positioning system (GPS), radio frequency (RF), and/or cellular communication signals are unavailable.

BACKGROUND

Humans have a basic desire for order and often seek to understand their past, present, and future location. For military, security, and/or investigative personnel, this basic desire of localization can be of critical importance; especially when operating in an area for the first time. Absent known landmarks and/or infrastructure options for positioning, it can be very easy to become lost and/or disoriented, which may lead to elevated stress levels and/or other potential hazards.

Existing tracking systems, including wearable tracking systems, generally rely on global positioning system (GPS), pre-deployed radio frequency (RF) infrastructure, and/or other positioning infrastructures. In urban, indoor, and/or underground environments, for example, GPS may become unavailable (i.e., a GPS-denied environment). Loss of GPS can cause significant problems in positioning for such tracking systems. While a variety of RF-based tracking systems have been developed to track a location of a person or object indoors (e.g., using cell tower and Wi-Fi signals), such tracking systems tend to rely on pre-deployed and/or potentially costly RF infrastructure. Therefore, a need exists for object-tracking systems designed for environments where GPS, RF, and/or cellular communication signals are unavailable.

SUMMARY

The present disclosure relates to an object-tracking system, including those designed for environments where GPS, RF, and/or cellular communication signals are unavailable.

According to a first aspect, an object-tracking system comprises: a camera configured to capture an image of a surrounding environment in accordance with a first camera configuration, wherein the camera is configured to adopt a second camera configuration; and a computer that is operatively coupled with the camera, wherein the computer is configured to: process the image from the camera, detect a moveable object within the image using a detection algorithm selected from a library of detection algorithms, estimate a current position of the moveable object, estimate a current position of a user relative to the current position of the moveable object, predict a future position of the moveable object, and determine the second camera configuration based at least in part on the future position of the moveable object.

In certain aspects, object-tracking system further comprises an inertial measurement unit (IMU), wherein the computer is configured measure at least one of an angular velocity or linear acceleration of the user.

In certain aspects, the computer is configured to: (1) estimate the current position of the user based at least in part on a measurement of the IMU; and (2) predict the future position of the moveable object based at least in part on a measurement of the IMU.

In certain aspects, the computer is configured to create or update a map to reflect the current position of the moveable object and the current position of the user relative to the moveable object.

In certain aspects, the camera is coupled to or integrated with a wearable that is associated with the user.

In certain aspects, at least one of the current position of the moveable object, the current position of the user, or the future position of the moveable object is determined using a Kalman filter.

In certain aspects, the computer is operatively coupled with a global positioning system (GPS), wherein the computer is configured to determine the current position of the user relative to the moveable object in a GPS-denied environment.

According to a second aspect, a positioning system, comprises: a camera, wherein the camera is oriented in accordance with a current pan, tilt, and/or zoom (PTZ) configuration, and wherein the camera is configured to capture an image while oriented in accordance with the current PTZ configuration; a processor configured to process the image using a computer vision technique; a controller configured to receive a current PTZ configuration from the camera, develop a new PTZ configuration, and communicate the new PTZ configuration to the camera; a detector configured to detect a moveable object within the image, wherein the moveable object is detected using a bounding box and a detection algorithm selected from a library of object detection algorithms, wherein the selection is based on a type of object being detected, and wherein the detector is configured to deactivate a detection algorithm if it is no longer compatible with the type of object being detected; and a state estimator configured to store a current estimated position of a user and calculate a new estimated position of the user based on the type of object, an estimated location of the moveable object, and a stored map, wherein the stored map includes the estimated location of the moveable object relative to the current estimated position.

In certain aspects, the camera is coupled to or integrated with a wearable that is associated with the user.

In certain aspects, the controller develops a new PTZ configuration at least partly based on at least one of: the type of object being detected, the new estimated position of the user, or information shared by the external device.

In certain aspects, the camera is an omnidirectional camera.

In certain aspects, the positioning system further comprises a second camera configured to capture an image.

In certain aspects, the positioning system further comprises an inertial measurement unit (IMU).

In certain aspects, the state estimator uses odometry, at least in part, to calculate a new estimated position of the user.

In certain aspects, the state estimator uses a Kalman filter.

In certain aspects, the positioning system further comprises an interface configured to receive user input, wherein the input is used to help determine the type of object being detected.

According to a third aspect, a method for visually localizing an individual comprises the steps of: capturing an image via a camera using a first pan, tilt, and/or zoom (PTZ) configuration; processing the image to determine an appropriate detection algorithm; selecting the appropriate detection algorithm from a library of detection algorithms; detecting an object within the image using the detection algorithm, wherein the detection algorithm circumscribes the object with a bounding box; determining whether the object is moving or stationary; in response to determining the object is stationary: estimating a position of the object in relation to one of a user or other objects, wherein the position is estimated using a Kalman filter and inertial measurements from an inertial measurement unit (IMU), and storing the position of the object in a map memory; determining a second PTZ configuration; and orientating the camera in accordance with the second PTZ configuration.

In certain aspects, computer vision is used in at least one of the steps of: processing the image, selecting the appropriate detection algorithm, detecting an object within the image, and determining whether the object is moving or stationary.

In certain aspects, the camera comprises a plurality of cameras that have omnidirectional coverage between them.

In certain aspects, the method further comprises the step of sharing at least one of estimated position and/or map information with an external device.

DRAWINGS

The foregoing and other objects, features, and advantages of the devices, systems, and methods described herein will be readily understood from the following description of particular embodiments thereof, as illustrated in the accompanying figures, where like reference numbers refer to like structures. The figures are not necessarily to scale, emphasis instead being placed upon illustrating the principles of the devices, systems, and methods described herein.

FIG. 1 illustrates components of an example object-tracking system.

FIG. 2 illustrates an example camera suitable for use with an object-tracking system.

FIG. 5b illustrates an enlarged portion of the image of FIG. 5a.

DESCRIPTION

Figure 3:
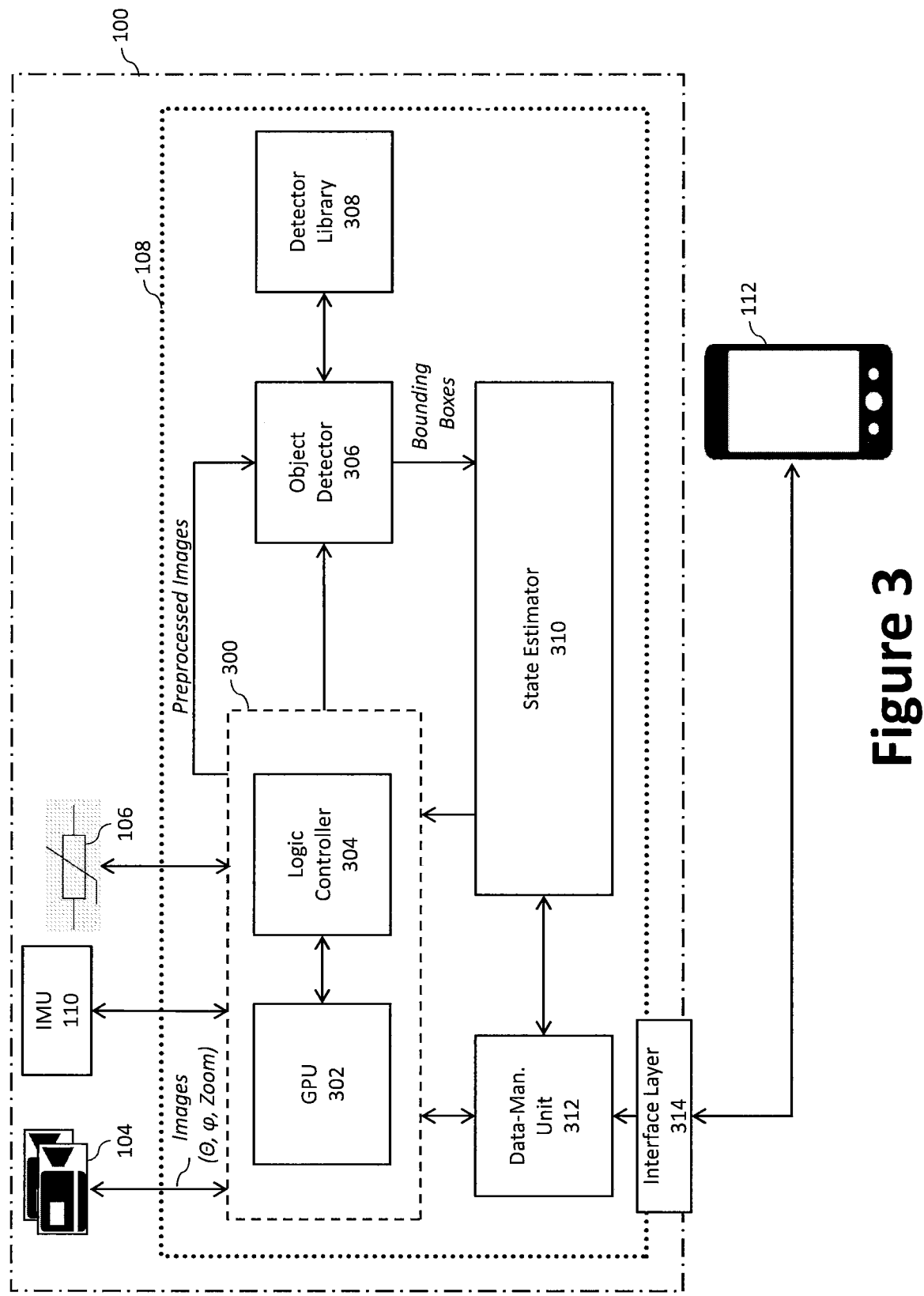
FIG. 3 illustrates a block diagram illustrating an example system architecture for the object-tracking system.

Preferred embodiments of the present disclosure will be described herein below with reference to the accompanying drawings. The components in the drawings are not necessarily drawn to scale, the emphasis instead being placed upon clearly illustrating the principles of the present embodiments. For instance, the size of an element may be exaggerated for clarity and convenience of description. Moreover, wherever possible, the same reference numbers are used throughout the drawings to refer to the same or like elements of an embodiment. In the following description, well-known functions or constructions are not described in detail because they may obscure the disclosure in unnecessary detail. No language in the specification should be construed as indicating any unclaimed element as essential to the practice of the embodiments. For this application, the following terms and definitions shall apply:

As used herein, the terms "about" and "approximately," when used to modify or describe a value (or range of values), mean reasonably close to that value or range of values. Thus, the embodiments described herein are not limited to only the recited values and ranges of values, but rather should include reasonably workable deviations.

As used herein, the term "and/or" means any one or more of the items in the list joined by "and/or." As an example, "x and/or y" means any element of the three-element set {(x), (y), (x, y)}. In other words, "x and/or y" means "one or both of x and y". As another example, "x, y, and/or z" means any element of the seven-element set {(x), (y), (z), (x, y), (x, z), (y, z), (x, y, z)}. In other words, "x, y and/or z" means "one or more of x, y and z".

As used herein, the terms "circuits" and/or "circuitry" refer to physical electronic components (i.e., hardware), such as, for example analog and/or digital components, power and/or control elements, and/or a microprocessor, as well as any software and/or firmware ("code") which may configure the hardware, be executed by the hardware, and or otherwise be associated with the hardware.

As used herein, the terms "communicate" and "communicating" refer to (1) transmitting, or otherwise conveying, data from a source to a destination, and/or (2) delivering data to a communications medium, system, channel, network, device, wire, cable, fiber, circuit, and/or link to be conveyed to a destination.

As used herein, the terms "coupled," "coupled to," and "coupled with" as used herein, each mean a structural and/or electrical connection, whether attached, affixed, connected, joined, fastened, linked, and/or otherwise secured. As used herein, the term "attach" means to affix, couple, connect, join, fasten, link, and/or otherwise secure. As used herein, the term "connect," means to attach, affix, couple, join, fasten, link, and/or otherwise secure.

As used herein, the term "database" means an organized body of related data, regardless of the manner in which the data or the organized body thereof is represented. For example, the organized body of related data may be in the form of one or more of a table, a map, a grid, a packet, a datagram, a frame, a file, an e-mail, a message, a document, a report, a list, or data presented in any other form.

As used herein, the term "exemplary" means serving as a non-limiting example, instance, or illustration. As utilized herein, the terms "e.g.," and "for example" set off lists of one or more non-limiting examples, instances, or illustrations.

As used herein, the term "memory" means computer hardware or circuitry to store information for use by a processor and/or other digital device. The memory can be any suitable type of computer memory or any other type of electronic storage medium, such as, for example, read-only memory (ROM), random access memory (RAM), cache memory, compact disc read-only memory (CDROM), electro-optical memory, magneto-optical memory, programmable read-only memory (PROM), erasable programmable read-only memory (EPROM), electrically-erasable programmable read-only memory (EEPROM), a computer-readable medium, or the like.

As used herein, the term "network" as used herein includes both networks and inter-networks of all kinds, including the Internet, and is not limited to any particular network or inter-network.

As used herein, the term "operatively coupled" means that a number of elements or assemblies are coupled together, such that as a first element/assembly moves from one state (and/or configuration, orientation, position etc.) to another, a second element/assembly that is operatively coupled to the first element/assembly also moves between one state (and/or configuration, orientation, position etc.) to another. It is noted that a first element may be "operatively coupled" to a second element without the opposite being true.

As used herein, the term "processor" means processing devices, apparatuses, programs, circuits, components, systems, and subsystems, whether implemented in hardware, tangibly embodied software, or both, and whether or not it is programmable. The term "processor" as used herein includes, but is not limited to, one or more computing devices, hardwired circuits, signal-modifying devices and systems, devices and machines for controlling systems, central processing units, programmable devices and systems, field-programmable gate arrays, application-specific integrated circuits, systems on a chip, systems comprising discrete elements and/or circuits, state machines, virtual machines, data processors, processing facilities, and combinations of any of the foregoing. The processor may be, for example, any type of general purpose microprocessor or microcontroller, a digital signal processing (DSP) processor, an application-specific integrated circuit (ASIC). The processor may be coupled to, or integrated with a memory device.

Disclosed herein are object-tracking systems, such as an object-agnostic tracking system, which may help identify a position of an individual (e.g., a user, which may be wearing a wearable) or object (e.g., a moveable object). The object-tracking system may also coordinate the position of the individual or object with the position(s) of other individuals or objects to help navigate the individual or object in unknown, uncertain, and complex environments. In other words, as will be described more fully below, the object-tracking system may provide detection and processing of moving and/or stationary objects (e.g., relative to the tracked object or person) to facilitate navigation and mapping in a GPS-denied, RF-denied, or other tracking-denied environment, thereby providing an estimation of a position (e.g., localization) of the individual (e.g., a user) or object (e.g., a vehicle, equipment, etc.) based on surrounding objects.

Vision-based position tracking can work effectively even in the absence of GPS and/or any deployed RF infrastructure. For example, vision-based position tracking offers the capability to locate itself (e.g., the person or object to which the optics are attached) and to create maps in a similar manner to humans. While research into GPS-independent personal tracking has led to highly accurate visual-inertial odometry-based algorithmic solutions, these algorithmic solutions are post-processed and often limited to a single core computer processing unit (CPU). Pan, tilt, and zoom (PTZ) network cameras, however, may help address the problem of position tracking in GPS-denied environments, for example. Some tracking algorithms may be associated with commercial, off-the-shelf (COTS) PTZ networked cameras, the majority of PTZ camera tracking algorithms are intrinsically coupled to the detection of the object and/or the control scheme implemented to track the object. Compounding errors related to object detection may result in inaccuracies in tracking. This may limit the number of objects the target tracking system can accurately track or requires retraining the entire system in order to track a different type of object accurately. Furthermore, algorithms may not be structured for rapid adaptation to the existing target tracking platform.

To address at least the foregoing, the present disclosure proposes an object-tracking system configured to track a position and/or location of a user (or object) without requiring GPS and/or a RF-deployable infrastructure. The object-tracking system may operate in GPS-denied and/or RF-denied environments at high accuracies, such as within 0.2% of total distance traveled, by developing more robust hardware and porting algorithms to take advantage of the general-purpose graphical processing unit (GPGPU) architecture. A GPGPU refers to a graphics processing unit (GPU) configure to perform non-specialized calculations that would typically be conducted by the CPU.

An objective of the object-tracking system is to facilitate object-agnostic PTZ tracking that is easily configurable for the type of object or person to be tracked, and highly extensible to other object domains with little work needed on the part of the user. In certain aspects, the object-tracking system may be configured to support the definition of generic, parameterized object detectors that reside within a set of standardized software modules trained by artificial neural networks. The design of this system architecture can maximize the extensibility of the architecture across all detection domains. The object-tracking system may further include a library of such object detectors that can be easily tailored for various use cases in a reconfigurable design that employs only the necessary algorithms and modules, while also enabling rapid activation or deactivation of algorithms as required.

Accordingly, the present disclosure describes a complete, extensible, reconfigurable, and object-agnostic system for the control of a networked PTZ camera for the task of object tracking and/or navigation. Therefore, the object-tracking system may provide a complete solution using one or more wearable sensors and a computer, such as a mobile device, enabled by the development of GPGPU computer vision algorithms for use on the computer. In certain aspects, the object-tracking system may be wearable yet unobtrusive, thereby combining a wearable (e.g., an article of clothing) with one or more small and/or discreet cameras and a computer. The object-tracking system may be configured to, inter alia: (1) achieve sub-5-meter accuracy, with worst case performance of sub-20-meter accuracy, across a two hour endurance mission, (2) process 500 thousand floating point operations per second (FLOPS) via a portable user device and will contain more than 100 GB of local storage to store information on the mapped area; (3) forward information using local communications infrastructure such as Wi-Fi, Bluetooth, or the cellular network; (4) obviate the need to rely on (a) deployable GPS/RF infrastructure to carry position finding and instead use images from the cameras and/or (b) prior surveys of the area; (5) provide output data that is compatible with local command and control (C2) mapping tools such as Cursor on Target; and (6) operate within location drift and data storage limits of up to 2 hours in GPS-denied environments from initial loss of GPS or similar precision fix.

FIG. 1 illustrates components of an object-tracking system 100. As illustrated, the object-tracking system 100 may comprise a control system 108 operably coupled with one or more sensors, such as cameras 104, temperature sensors 106, an inertial measurement unit (IMU) 110, microphones (which may be integrated with a camera 104, for example), etc. As shown, the object-tracking system 100 may include, or be embodied as, a wearable 102, such as a cap, hat, helmet, shirt, jacket, sweater, shoe, boot, glove, skirt, pair of pants, shorts, glasses, and/or any other suitable article of clothing, clothing accessory, and/or other types of wearable.

In certain aspects, the object-tracking system 100 may adapt commercially available, off-the-shelf wearable, small surveillance cameras 104, to be unobtrusively embedded into a wearable 102. The cameras 104 may be operably coupled with a computer 112 via a control system 108, which may integrated with the wearable 102. The object-tracking system 100 may implement a multi-state constrained Kalman filter (MSCKF) to maintain navigational accuracy using one or more spy cameras 104 performing simultaneous localization and mapping (SLAM) to improve performance of an inertial measurement unit (IMU) 110 under GPS-denied conditions. In operation, the cameras 104 and/or computer 112 may serve to capture visual data (image data) and perform real-time visual odometry and/or tracking of identified objects in space, even under GPS-denied situations such as urban or subterranean environments.

While the object-tracking system 100 will be described primarily in connection with a wearable 102 for tracking a user (e.g., a person or animal), the object-tracking system need not be embodied in a wearable. Rather, the object-tracking system 100 may serve to facilitate localization and/or navigation of virtually any moveable objects, including, for example, vehicles (e.g., cars, aircraft, vessels etc.), equipment, and other objects. For example, the object-tracking system 100 may be integrated into a movable object or vehicle (e.g., as part of its control or navigation system) to provide the disclosed features.

The control system 108 and one or more sensors may be attached to (and/or embedded into) the wearable 102 (illustrated as a cap). For example, the cameras 104 may be embedded into the semi-rigid cap lining of the wearable 102. In certain aspects, the cameras 104 may provide omnidirectional coverage when considered in combination. That is, the cameras 104, in combination, may have some ability to captured images and/or video from a substantially 360 degree area around a user wearing and/or operating the cameras 104, in each of the x, y, and z planes in a Cartesian coordinate system. Similarly, one or more temperature sensors 106 may also be attached to (and/or embedded into) the wearable 102. In some examples, one or more of the temperature sensors 106 may be configured to measure a coefficient of thermal expansion (CTE). In some examples, one or more of the temperature sensors 106 may comprise a thermistor, a thermostat, etc.

The object-tracking system 100 may further include, or be operatively coupled with, a computer 112. For example, the object-tracking system 100 may include a transceiver 126 configured to communicate with the computer 112, which may be locally or remotely situated relative to the control system 108 and/or wearable 102. In certain aspects, the computer 112 may be a commercial off-the-shelf (COTS) mobile device, such as a smartphone, tablet computer, personal digital assistant (PDA), smartwatch, smart glasses, laptop computer, portable gaming device, and/or other similar device; though the computer 112 may also be a remote computer or other processor-equipped device, including stationary computers situated at a command center, for example. In certain aspects, the computer 112 may comprise a customized device and/or a customized microchip. In certain aspects, the object-tracking system 100 may include, or be operatively coupled with, a plurality of computers 112.

The computer 112 may comprise a processor 120, a display 116, one or more memory devices 122 (e.g., RAM, ROM, flash memory, etc.), a transceiver 124, and/or a user interface (UI) 114. The computer 112 may be configured to communicate with the control system 108 directly or via a communication network 118 (e.g., the Internet or another network). For example, the control system 108 may be configured to communicate with the computer 112 via the transceivers 124, 126 (e.g., wireless transceivers), which may be configured to communicate via one or more wireless standards such as Bluetooth (e.g., short-wavelength, UHF radio waves in the ISM band from 2.4 to 2.485 GHz), NFC, Wi-Fi (e.g., IEEE 802.11 standards), etc. However, it is also contemplated that the computer 112 may be configured to communicate with the control system 108 via a wired-connection.

In certain aspects, the display 116 may provide at least part of the user interface 114. For example, the display 116 may be configured as a touch screen display, whereby the user interface 114 is a touch screen digitizer overlying an LCD display. In this example, the display 116 may display a graphical user interface (GUI), which may be selected via the touch screen. In other examples, the user interface 114 be, or include, a microphone to facilitate speech-recognition techniques. The camera(s) 104, temperature sensor(s) 106, control system 108, and/or computer 112 may be operatively coupled to one another via wires, cables, conductors, and/or other electrical means known to those of ordinary skill in the art. In certain aspects, the camera(s) 104, temperature sensor(s) 106, control system 108, and/or computer 112 may be operatively coupled using wireless technology, such as through a cellular telephone network (e.g., TDMA, GSM, and/or CDMA), Wi-Fi (e.g., 802.11 a, b, g, n, ac), Bluetooth, Near Field Communications (NFC), optical communication, radio communication, and/or other appropriate wireless communication techniques.

FIG. 2 illustrates an example camera 104 that may be used in the object-tracking system 100. In certain aspects, the camera 104 may comprise a small, discreet, surveillance camera that may be relatively easily concealed such that it is relatively inconspicuous. In certain aspects, the camera 104 may comprise an optical sensor configured to capture photographic, video, and/or audiovisual images. The camera 104 may be configured to operate in different modes, such as, for example, normal mode, night vision mode, thermal mode, infrared mode, etc. In certain aspects, the user may select the appropriate camera 104 mode through the user interface 114. In certain aspects, the camera(s) 104 may automatically detect a most appropriate mode for the environment and either suggest the most appropriate mode (and/or one or more other modes) to the user or automatically switch to the most appropriate mode.

The camera 104 may be operatively coupled to a camera module 200, which may support the camera 104 and provide electrical inputs and outputs (e.g., power and/or data—such as a video feed) to or from the camera 104. In certain aspects, the camera module 200 may be embodied as a circuit board. The camera module 200 may be operatively coupled to other components of the object-tracking system 100 via a cable 202, thereby obviating the requirement for the transceiver and/or the local battery. The cable 202 may carry power, data, or both power and data. In certain aspects, the cable 202 may be omitted and data may be transmitted to/from the control system 108 via a transmitter, receiver, and/or transceiver integrated into the camera module 200. Accordingly, the camera module 200 may include or be coupled to a wireless transceiver and/or a local battery to supply electrical power to the camera 104.

The camera 104 may be configured to send and/or receive information with the control system 108 via the camera module 200 and/or cable 202. Such information may comprise, for example, image data (whether a video feed, still images, etc.), a command to capture an image/video feed, a notification that an image has been captured, image information, a command to adopt a particular configuration (e.g., a pan, tilt, and/or zoom configuration), a notification that a particular configuration has been adopted, and/or other appropriate information, data, or commands.

The camera 104 may be a pan, tilt, and zoom (PTZ) camera, for example, that is configured to pan (and/or swivel, rotate, revolve, twist, etc.) around the Y axis. In certain aspects, the camera 104 may be configured to pan a full 360 degrees. In other aspects, the camera 104 may be configured to pan less than 360 degrees, such as 270 degrees, or 180 degrees. The camera 104 may be further configured to tilt (swivel, rotate, revolve, twist, etc.) about the X axis. In certain aspects, the camera 104 may be configured to tilt a full 360 degrees. In other aspects, the camera 104 may be configured to tilt less than 360 degrees, such as 270 degrees, or 180 degrees. In certain aspects, the camera module 200 may obstruct image capture at certain tilt angles. In certain aspects, the camera 104 may be integrated with or implemented to a control unit (e.g., control of pan, tilt, or zoom).

The camera 104 may further be configured to zoom in and out, using a zoom lens 204, whereby the zoom lens 204 is configured to vary its focal length to magnify (and/or enlarge) an image of a scene. In certain aspects, the zoom lens 204 may be an ultra-wide-angle lens, such as a fisheye lens, for example. In certain aspects, the zoom lens 204 may comprise a 220-degree megapixel (MP) quality fisheye lens and the camera 104 may comprise an 18-megapixel universal serial bus (USB) camera. In examples where multiple cameras are used, each camera 104 may have the same PTZ capabilities or different PTZ capabilities.

FIG. 3 illustrates the various components of the control system 108 relative to the other components of the object-tracking system 100. As illustrated, the control system 108 generally comprises processing circuitry 300, an object detector 306, a detector library 308, a state estimator 310, and/or a data-management unit 312. The data-management unit 312 may be a data distribution service (DDS), for example. The processing circuitry 300 may comprise, for example, a graphical processing unit (GPU) 302 and a logic controller 304. While illustrated as separate components, the GPU 302 and the logic controller 304 may be integrated into a single component such as a processor or CPU. In certain aspects, the IMU 110 may be integrated with the control system 108 (e.g., provided via a single board or chip).

In operation, the components of the object-tracking system 100 move through a process of: (1) acquiring, from the camera 104, image data of scene(s) and the current camera 104 configuration; (2) preprocessing the captured images via the processing circuitry 300; (3) detecting, via the object detector 306, objects within the image of the scene; (4) filtering, via the object detector 306 and/or the detector library 308, the found bounding boxes; (5) estimating, via the state estimator 310, a state of the system from these bounding boxes; and (6) determining, via the processing circuitry 300, the control outputs (pan, tilt, zoom) to send back to the camera 104. Additionally, various types of information can be sent from the state estimator 310 and/or processing circuitry 300 to the data-management unit 312. The data-management unit 312 may communicate with the computer 112 via transceivers 124, 126 (whether through a wire or wirelessly via an antenna system). In certain aspects, the communication may be processes through an external interface layer 314 (e.g., communications bus).

The control system 108 may be provided as a single microchip, such as a system-on-chip (SoC) or system-on-board (SoB). For example, the GPU 302, data-management unit 312, logic controller 304, object detector 306, and/or state estimator 310 may all be contained within (or provided) via a single microchip. In some aspects, the detector library 308 may also be integrated into the single microchip. In certain aspects, the components of the control system 108 may be implemented in hardware, software, and/or a combination of the two. In certain aspects, the components of the control system 108 may be implemented across several microchips and/or other devices. While the control system 108 is illustrated as a standalone component that is independent from the computer 112, the control system 108 may be integrated with the computer 112 depending on the application.

In operation, the GPU 302 may be configured to process images (i.e., image data) received from the camera 104. The GPU 302 may be operatively coupled to the camera 104 over a wired and/or wireless communication connection. In certain aspects, the GPU 302 may be configured to implement real-time computer vision techniques, such as feature extraction. The GPU 302 may additionally, or alternatively, be configured to assist with the visual odometry of the object-tracking system 100. For instance, the visual odometry method may comprise an extended Kalman filter (EKF) based algorithm, such as a multi-state constrained Kalman filter (MSCKF). The visual odometry method may be implemented at least partially using a vectorized computer programming language, such as OpenCL, for example.

Figure 6A:
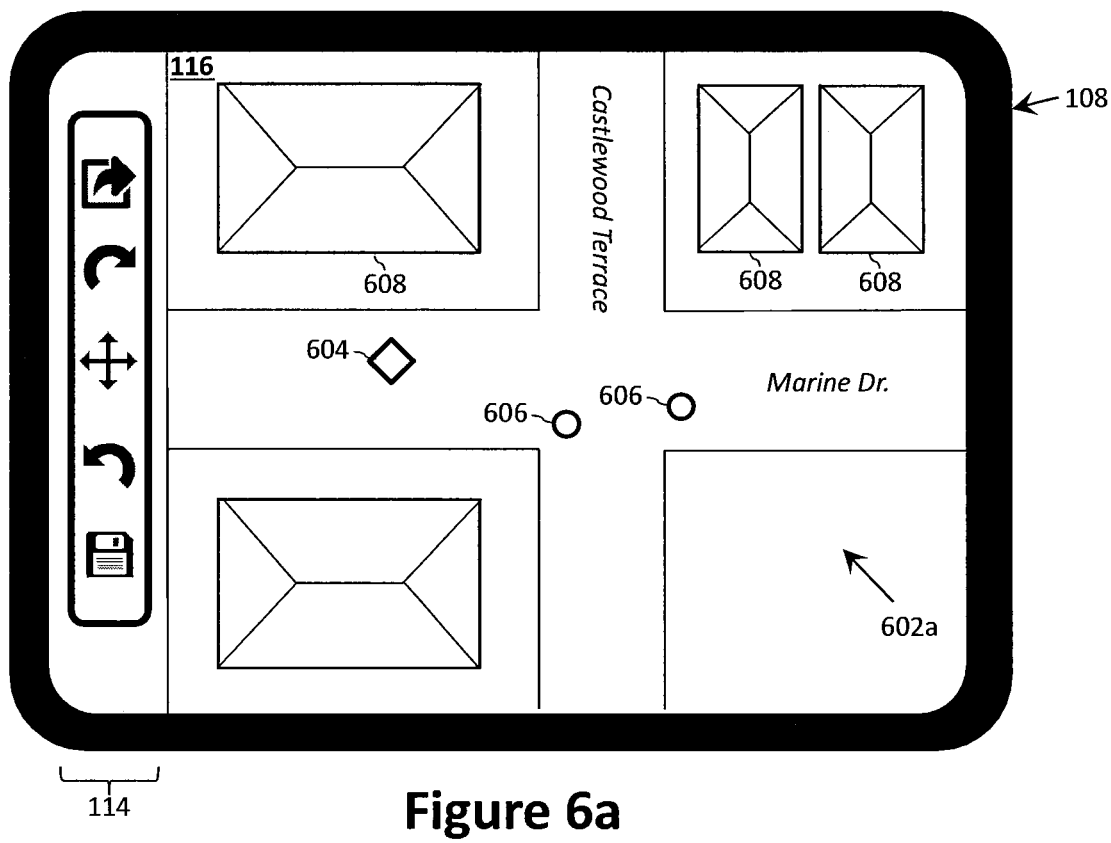
FIGS. 6a and 6b illustrate example maps that may be generated and/or maintained by the object-tracking system of FIG. 1.
Figure 6B:
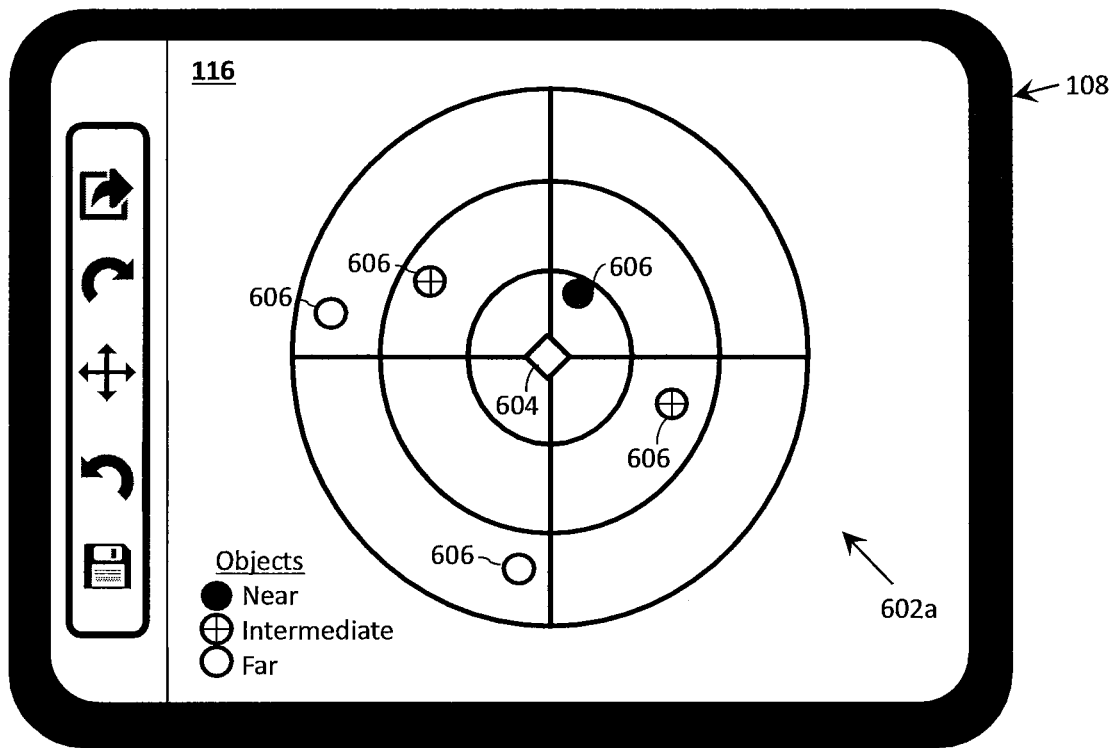

In certain aspects, the GPU 302 may be operatively coupled to a display (e.g., a local display or the display 116 of the computer 112) and/or a user interface (e.g., a local user interface or the user interface 114 of the computer 112). The communication may be facilitated through the data-management unit 312 and/or interface layer 314 or through other suitable methods. The GPU 302 may be configured to render image data (e.g., graphics, images, photographs, and/or video) to the display 116. For example, the GPU 302 may render a map and/or relative positions of one or more users and/or one or more objects relative to the user to the display 116, example of which are illustrated in FIGS. 6a and 6b. The GPU 302 may also be operatively coupled to the data-management unit 312, the camera 104, and the logic controller 304. In certain aspects, the GPU 302 may be operatively coupled to other components as well.

The logic controller 304 may be configured to execute certain programmed and/or logical processes of the object-tracking system 100, either alone or in combination with other components of the object-tracking system 100. In certain aspects, the logic controller 304 may be a processor, such as a CPU. In certain aspects, the logic controller 304 may be, for example, an octo-core CPU with four cores running at 2.45 Hz and four cores running at 1.9 GHz. As noted above, the GPU 302 may be integrated with the logic controller 304.

The camera 104 may be configured to capture an image of a surrounding environment in accordance with a plurality of camera configurations (e.g., PTZ configurations) by adopting one or more camera configurations. For example, the camera 104 may capture a first image (or first video feed) using a first camera configuration and then capture a second image (or second video feed) using a second camera configuration. The logic controller 304 may be configured to determine an appropriate second PTZ configuration (e.g., a new PTZ configuration) for the camera 104 as a function of a first PTZ configuration (e.g., a current or prior PTZ configuration). For example, the logic controller 304 may use information regarding the current PTZ camera 104 configuration in making its selection of the second PTZ configuration. The current PTZ camera configuration may be provided by the GPU 302, which may also assist in making the determination. The logic controller 304 may also use information from the state estimator 310 to make the selection. For example, the logic controller 304 may use prediction and/or estimation information regarding certain objects that were detected and/or tracked, as well as the user of the object-tracking system 100 and/or users of other object-tracking systems to determine the new PTZ camera configuration(s). For example, the new PTZ configuration may correspond to a configuration that will direct the camera 104 toward an approximate estimated and/or predicted bounding box center/centroid of an object being tracked within the scene of the image. The logic controller 304 (and/or GPU 302) may determine a new PTZ configuration for each camera 104. In some instances, the new PTZ configuration may be identical or substantially similar to the current PTZ configuration.

The logic controller 304 may also be configured to send other commands to the GPU 302 and/or camera 104. For example, the logic controller 304 may send a command to capture an image immediately, such as in response to a similar command from a user via the user interface 114. In certain aspects, the logic controller 304 may send a command to the GPU 302 and/or camera 104 capture an image every time the camera 104 is to capture a new image. In certain aspects, the command to capture an image may be part of the new PTZ configuration. In certain aspects, the GPU 302 and/or camera 104 may continually captured images even in the absence of a specific command from the logic controller 304. In certain aspects, the GPU 302 and/or camera 104 may abstain from capturing an image unless a specific command is received. In some examples, a user may select via the interface 114 whether the camera 104 should await a specific command before capturing an image or if the camera 104 should continually captured images.

The object detector 306 may be configured to detect objects within a scene of the image, such as an image captured by the camera 104. The object detector 306 may be a parameterized object detector, such that the object detector 306 may be compatible with a wide variety of domains. The object detector 306 may be implemented as hardware, software, or a combination thereof. In certain aspects, the object detector 306 may be a class and/or class instance, such as when the object detector 306 is implemented using an object oriented programming language. In certain aspects, the object detector 306 may be implemented using OpenCL, C, C++, Java, Python, Perl, Pascal, and/or other applicable methods. The object detector 306 may be operatively coupled to the GPU 302 and/or the state estimator 310. The object detector 306 may additionally be in communication with a detector library 308. The coupling between the object detector 306 and the detector library 308 may be via a human-machine interface. The detector, for example, may be chosen via the human-machine interface (e.g., display 116 of computer 112) and loaded from the detector library 308.

The detector library 308 may employ one or more algorithms (and/or methods, modules, etc.) for detecting an object as a function of the image data. The detector library 308 may additionally, or alternatively, comprise a collection of control schemes for tracking an object. Generally speaking, the detector library 308 can serve as a collection of algorithms and/or a library (e.g., a collection of known/learned images). The detector library 308 assists the object-tracking system 100 in determining which objects in the scene are moving and which are not.

As the user (or object) and/or camera 104 moves, the detector library 308 creates a map of the environment. As can be appreciated, the object-tracking system 100 should distinguish which objects are moving. For example, signs can be categorized as static, while faces may be categorized as moving. The object-tracking system 100 can learn attributes of the static objects and/or can start with the known attributes via the detector library 308. In other aspects, it is also contemplated that the object-tracking system 100 may create a library of images between the two categories. To identify the objects within the images, one or more image processing techniques may be employed. For example, the one or more image processing techniques may include 2D and 3D object recognition, image segmentation, motion detection (e.g., single particle tracking), video tracking, optical flow, 3D Pose Estimation, etc.

In certain aspects, the detection algorithms and tracking control schemes may be linked and/or otherwise associated. In certain aspects, the detection algorithms and tracking control schemes may be structured to conform to a particular modular format, to be easily swapped in and/or out of the object detector 306. In certain aspects, the detecting algorithms and/or tracking schemes may be tailored for various use cases in a reconfigurable design. In certain aspects, the detection algorithms and tracking control schemes may be trained through machine learning by artificial neural networks. In some examples, certain detection algorithms and/or tracking control schemes may be more appropriate for detecting and/or tracking a particular class, classification, type, variety, category, group, and/or grade of object than others. The detector library 308 may be implemented in hardware and/or software. In certain aspects, the detector library 308 may comprise a database.

The object detector 306 may activate appropriate detecting algorithms and/or tracking schemes, while deactivating inappropriate detecting algorithms and/or tracking schemes; depending on the object being detected and/or tracked. In certain aspects, the object detector 306 may activate and/or deactivate detecting algorithms as a function of the class, classification, type, variety, category, group, and/or grade of the object being detected and/or tracked. In certain aspects, the object detector 306 may activate appropriate detecting algorithms and/or tracking schemes and/or deactivate inappropriate detecting algorithms and/or tracking schemes, depending on the desired and/or selected use case.

In certain aspects, the GPU 302 may provide the object detector 306 with preprocessed images from the camera 104, to assist the object detector 306 in determining the appropriate detecting algorithms and/or tracking schemes to activate and/or deactivate. In certain aspects, the user may provide information through the user interface 114 to assist the object detector 306 in determining the appropriate detecting algorithms and/or tracking schemes to activate and/or deactivate. For example, the user may input information regarding the surrounding environment, such as the approximate region, whether it is indoors, outdoors, urban, rural, elevated, underground, etc. This may assist the object detector 306 in excluding less useful detecting algorithms and/or tracking schemes (e.g., mountain detectors/trackers in an underground urban environment, elevator detectors/trackers in an outdoor rural setting, etc.). In certain aspects, the object detector 306 may automatically detect aspects of the surrounding environment to activate and/or deactivate the appropriate detecting algorithms and/or tracking schemes. In cases where detection of the object requires differentiation between the object and various environmental cues, features may be extracted from the image(s) that are independent of the object bounding box. Aspects of the environment, such as foreground/background classification, environment classification, lighting, etc. The object detector 306 architecture may be configured to allow for an object-agnostic PTZ camera 104 target tracking system that is easily configurable for the type of object to be tracked and highly extensible to other object domains with little work needed on the part of the user.

In certain aspects, the object detector 306 may use a bounding box to circumscribe an object within a scene during detection. In certain aspects, the detector may use a centroid, centered within the bounding box, to assist with detecting and/or tracking an object. In certain aspects, the object detector 306 may determine whether the detected object is moving independently of any movement by the user and/or object-tracking system 100. In certain aspects, the object detector 306 may use information provided by the state estimator 310 to assist in determining whether an object is moving or is stationary. For example, the cameras 104 may be used to identify objects through three-dimensional reconstruction techniques such as optical flow to process a sequence of images. Optical flow may be used to determine the pattern of apparent motion of objects, surfaces, and edges in a visual scene caused by the relative motion between an observer and a scene (image).

In certain aspects, the object detector 306 may use audio information from the camera 104 in determining whether an object is moving or stationary. For example, a changing amplification of a particular sound, and/or a changing frequency of a particular sound, may be interpreted as indicating movement. The object detector 306 may disregard objects (and/or corresponding bounding boxes and/or centroids) that are determined to be moving. Moving objects may be, for example, humans, vehicles, and/or animals. The object detector 306 may provide bounding box and/or centroid information corresponding to stationary objects to the state estimator 310. Stationary object may comprise, for example, sign posts, landmarks, vending machines, entrance/exit doors, building architecture, topography, etc. In certain aspects, the object detector 306 may perform its operations in conjunction with (and/or with assistance from) other components of the object-tracking system 100, such as, for example, the logic controller 304, the GPU 302, the IMU 110, the data-management unit 312, and/or the state estimator 310.

The IMU 110 may be configured to measure the user's specific force, angular rate, and/or magnetic field surrounding the user. The IMU 110 may additionally, or alternatively, measure angular velocity, rotational rate, and/or linear acceleration of the user. The IMU 110 may comprise one or more of an accelerometer, a gyroscope, and/or a magnetometer. In certain aspects, the IMU 110 may comprise a plurality of accelerometers, gyroscopes, and/or magnetometers.

The state estimator 310 may be configured to perform a variety of tasks. In certain aspects, the state estimator 310 may estimate and/or predict the current and/or future position(s) (and/or location(s)) of one or more objects detected and/or tracked by the camera 104 and/or object detector 306. In certain aspects, the state estimator 310 may estimate and/or predict the current and/or future position(s) (and/or location(s)) of one or more users of the object-tracking system 100. In certain aspects, the state estimator 310 may perform simultaneous localization and mapping (SLAM) using one or more SLAM algorithms to estimate and/or predict the current and/or future position(s) of objects and users in the local environment. In certain aspects, the state estimator 310 may employ visual odometry with a Kalman filter to assist in performing its prediction and/or estimation. In certain aspects, the Kalman filter may be a multi-state constrained Kalman filter (MSCKF). In certain aspects, the state estimator 310 may also employ traditional odometry with information provided by the IMU 110 to assist in its prediction and/or estimation. In some examples, drift may be prevalent in the measurements of the IMU 110, and the visual odometry used by the state estimator 310 may help to correct for this drift. In some examples the IMU 110 may be part of the computer 112. Information to and/or from the IMU 110 may be routed through the data-management unit 312.

The state estimator 310 may use information from the object detector 306 and/or IMU 110, in conjunction with SLAM algorithms, odometry methods, and/or visual odometry methods, to estimate and/or predict the current and/or future position(s) of the user and/or objects in the local environment, and may generate, maintain, and/or update a local map with this information. The map may be stored in a memory device 122. In certain aspects, the map may be generated using map information acquired before tracking services (e.g., GPS, satellite, and/or cellular communication abilities) were lost. The GPU 302 may be configured to render the map on the display 116 in accordance with corresponding selection by the user via the user interface 114, an example of which is described in connection with FIGS. 6a and 6b.

The data-management unit 312 may be configured to provide an interface between components of the object-tracking system 100, and/or other systems and/or devices external to the object-tracking system 100. For example, the data-management unit 312 may provide an interface between the GPU 302, controller, state estimator 310, and/or object detector 306 and the memory device 122, IMU 110, and/or user interface 114. The data-management unit 312 may also provide an interface between the object-tracking system 100 and computer 112 (or another external device, such as a base station computer or a second computer 112). For example, the data-management unit 312 may help provide an interface between the object-tracking system 100 and other users operating a similar system. In certain aspects, the data-management unit 312 may interact with an interface layer 314 to perform its operation. The interface layer 314 may include circuitry, software, ports, and/or protocols compatible with communication with components of the object-tracking system 100, and/or other systems and/or devices external to the object-tracking system 100. For example, the data-management unit 312 may include circuitry, software, ports, and/or protocols to enable wired and/or wireless communication, such as cable ports (e.g., HDMI, CAT5, CAT5e, CAT 6, USB, etc.), wireless receivers, wireless transmitters, wireless transceivers, wireless communication protocols, Bluetooth circuitry (and/or corresponding protocols), NFC circuitry (and/or corresponding protocols), etc.

Figure 4:
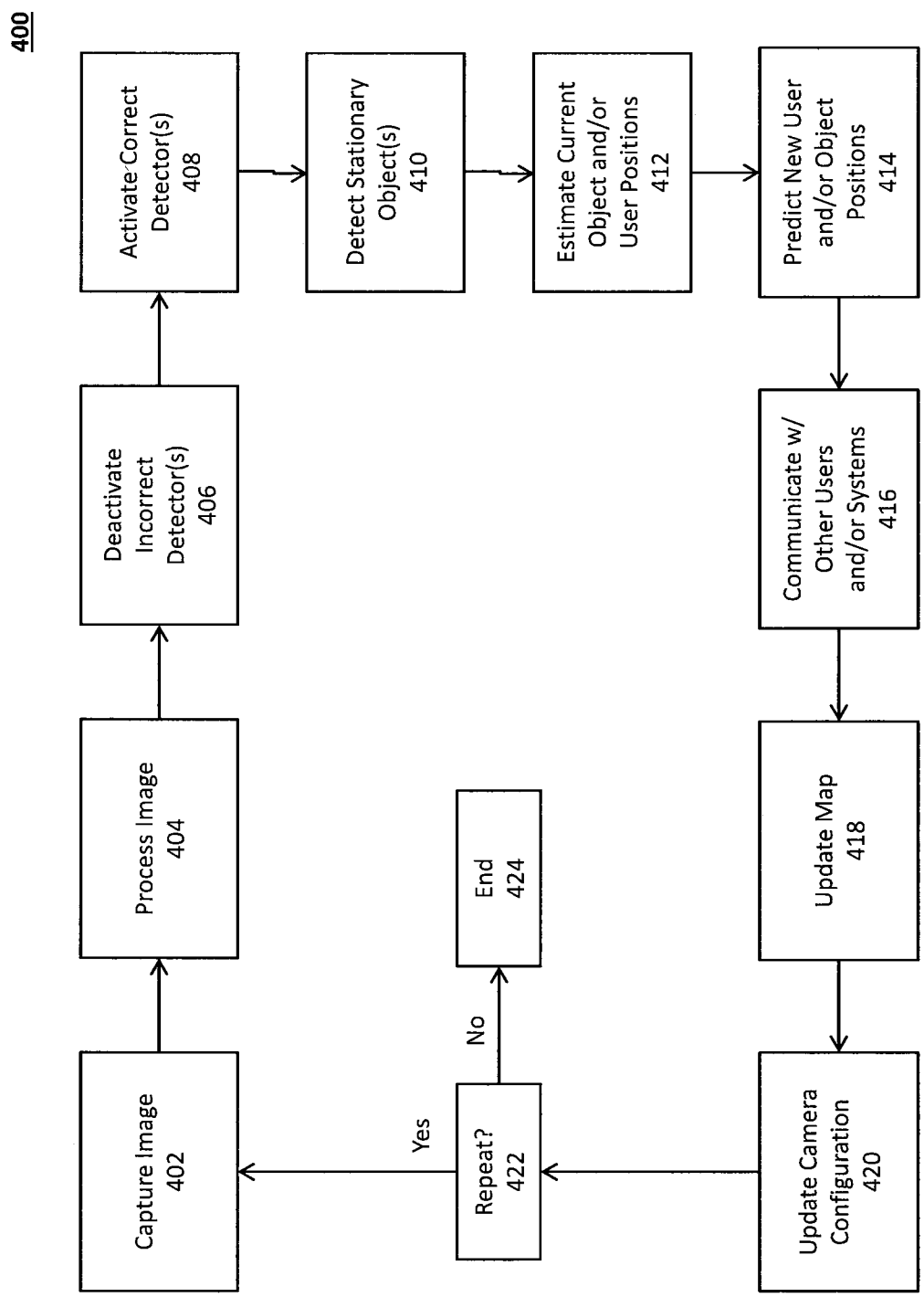
FIG. 4 illustrates a flow diagram reflecting an operation of the object-tracking system.

FIG. 4 illustrates an example method of operation 400 for the object-tracking system 100. The example assumes that the object-tracking system 100 has already been engaged, either manually or automatically, such as when, for example, the computer 112 loses a GPS, satellite, and/or cellular communication signal. The system begins at step 402, where the camera 104 captures image data representing an image of a scene of the environment. The image may be a photographic, video, and/or audiovisual image. The image may in fact be multiple images captured by multiple cameras 104 of the system. Each image may be analyzed jointly or independently of one another. The image may be captured while the camera is in a position and/or orientation corresponding to a current PTZ configuration. The image may be captured in response to a specific command by the logic controller 304, an implied command by the logic controller 304, and/or in response to user input. Prior to image capture, the camera 104 and/or GPU 302 may send a preprocessed version of the image to the object detector 306 to assist with activating and/or deactivating detector algorithms and/or tracking control schemes.

At step 404, the image is processed by the GPU 302. The GPU 302 may use feature extraction and/or other computer vision and/or image processing techniques to process the image. At step 406 the object detector 306 may deactivate one or more detector algorithms and/or tracking control schemes that are not suitable. At step 408, the object detector 306 may activate one or more detector algorithms and/or tracking control schemes that are suitable. At step 410, the object detector 306 may use the activated detector algorithms and/or tracking control schemes to detect stationary objects within the captured image. Objects that are determined to be moving may be discarded by the object detector 306. As best-illustrated in the captured image 500 of FIGS. 5*a* and 5*b*, a bounding box that circumscribes the object may be used when performing the detection algorithm and/or tracking control scheme.

At step 412, current positions are estimated for the user and one or more objects detected in the captured image (e.g., captured image 500). The current position estimation of the user may be based on one or more previous user and/or object position estimations and/or predictions, previously compiled map information, IMU 110 information, the current PTZ configuration of the camera 104, the detected object(s) in the captured image, the position and/or estimated position of the object(s) in the captured image, and/or other information, in conjunction with SLAM, odometry, and/or visual odometry methods The current position estimation of each object may be based on one or more previous user and/or object position estimations and/or predictions, previously compiled map information, IMU 110 information, the current PTZ configuration of the camera 104, the detected object(s) in the captured image, the position and/or estimated position of the object(s) in the captured image, and/or other information, in conjunction with SLAM, odometry, and/or visual odometry methods. In such cases the current position estimate of the object as determined by the object detector can be fused with the estimated position of the object from other visual odometry methods.

At step 414, new positions are predicted for the user and one or more objects detected in the captured image. The new position prediction of the user may be based on the current user position estimation, one or more current object position estimations, one or more previous user and/or object position estimations and/or predictions, previously compiled map information, IMU 110 information, the current PTZ configuration of the camera 104, the detected object(s) in the captured image, the position and/or estimated position of the object(s) in the captured image, and/or other information, in conjunction with SLAM, odometry, and/or visual odometry methods. The new position prediction of each object may be based on the current user position estimation, one or more current object position estimations, one or more previous user and/or object position estimations and/or predictions, previously compiled map information, IMU 110 information, the current PTZ configuration of the camera 104, the detected object(s) in the captured image, the position and/or estimated position of the object(s) in the captured image, and/or other information, in conjunction with SLAM, odometry, and/or visual odometry methods.

At step 416 the object-tracking system 100 may communicate with other users and/or systems external to the object-tracking system 100. The data-management unit 312 and/or interface layer 314 may help provide an interface between the object-tracking system 100 and other users operating a similar system and/or other systems. Information may be communicated between the object-tracking system 100 of the user and other users and/or systems external to the object-tracking system 100. For example, the communicated information may include new position predictions of other users and/or objects, current position estimations of other users and/or objects, one or more previous user and/or object position estimations and/or predictions, previously compiled map information, information relating to the external system (e.g., IMU information, PTZ camera configuration, etc.), and/or other information.

At step 418, the map may be updated with the current position estimations of the user and/or one more objects. The map may be have been previously generated when GPS, satellite, and/or cellular communication was still available, or may be newly generated by the object-tracking system 100. The map may additionally be updated to include information acquired at step 416. Example maps are described in greater detail in connection with FIGS. 6*a* and 6*b*.

At step 420 the camera configuration may be updated with a new PTZ configuration. Thereafter, the process may repeat until manually terminated by the user or automatically terminated (such as if GPS, RF, and/or cellular communication is restored). At step 422, the process may either repeat with additional captured image data or terminate at step 424 (e.g., upon regaining tracking services, termination by the user via computer 112, etc.).

While described in a particular order, the steps described in connection with FIG. 4 may overlap, occur in parallel, occur in a different order, and/or occur multiple times. For example, steps 402 and 404 may overlap, such that some images are being processed while others are being captured, and/or some parts of the image are processed while the image is still being captured. In some examples, some parts of the image may be preprocessed before image capture. In certain aspects, the order of steps 406 and 408 may be reversed, overlap, and/or performed in parallel. In some examples steps 414 and 412 may be reversed, overlap, and/or performed in parallel. In some examples, step 418 may be performed before step 416, in parallel with 416, overlapping with 416, and/or both before and after step 416.

The following example scenario illustrates how a user of the object-tracking system 100 might use the object-tracking system 100. As the user enters an underground market, the user's cell phone loses GPS signal. The core software (e.g., its operating system) running on the user's computer 112 activates the cameras 104 on the user's wearable 102 via control system 108 and begins to localize and map the market.

As the camera 104 captures images, the image processing algorithm on the computer 112 tracks easily identified, stationary objects to register scenes across images. The algorithm makes a key distinction between moving objects such as humans, cars, or animals versus stationary objects. This allows the algorithm to remove moving objects at an early stage. Stationary objects to be tracked include characters on sign posts, landmarks, vending machines, entrance and exit doors, and ordinary household items. The algorithm on the computer 112 performs SLAM to generate and/or store a map of the local region for future use while tracking the user's location on the map.

Figure 5A:
FIG. 5a illustrates an example image of a scene that may be captured and/or processed by the object-tracking system.
Figure 5B:
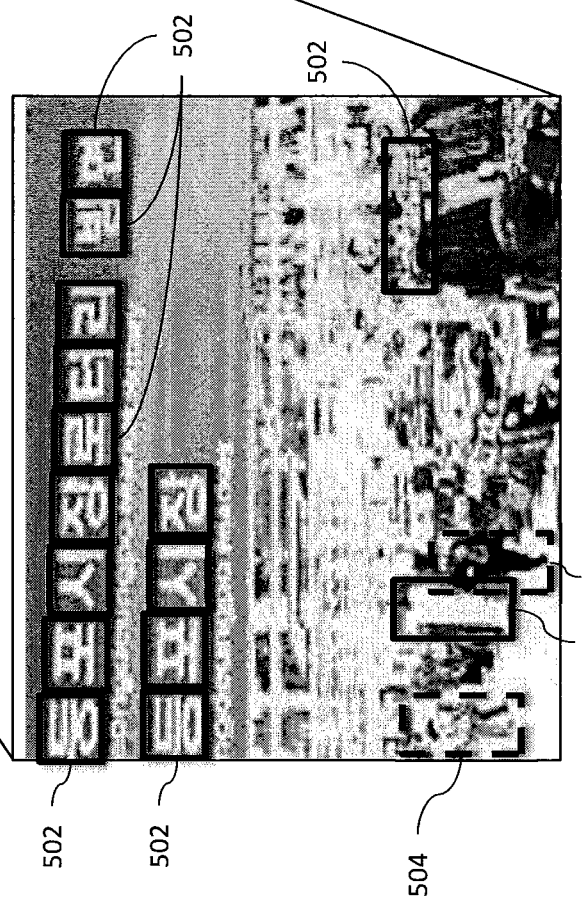

FIG. 5*a* illustrates an example image 500, such as might be captured, and/or processed by the object-tracking system 100 of FIG. 1, while FIG. 5*b* is a magnified portion of the example image 500 of FIG. 5*a*. As best illustrated in FIG. 5*b*, bounding boxes 502, 504 may be used to track and/or process features of the image 500. In certain aspects, stationary objects and moving objects may be tracked differently and relative to one another. For purpose of mapping moveable objects may be ignored while stationary objects may be included in the map. For navigation purposes, both moveable and stationary objects may be tracked to mitigate risk of location between the user and the objects in the environment. As illustrated, stationary objects, such as text/characters on a sign and/or fixtures position in an area are labeled using solid-line bounding boxes 502, while moving (or moveable) objects, such as pedestrians, are labeled using dashed-line bounding boxes 504. The objects within each of the bounding boxes 502, 504 may be processed and/or identified (e.g., via the control system 108 and/or computer 112). For example, optical character recognition (OCR) may be used to process the text within the solid-line bounding boxes 502. Similarly, facial recognition techniques may be used to identify a person (or other traits of the person, such as gender, age, ethnicity, etc.), such as those individuals in the dashed-line bounding boxes 504.

FIGS. 6a and 6b illustrate example maps 602a, 602b, which may be generated/updated by the object-tracking system 100 for display on a display (e.g., display 116). As illustrated, a user interface 114 may be provided (e.g., via display 116, which may be touch screen) to enable the user to manipulate the map via one or more functions, such as zoom, pan, rotate, save, etc. The maps 602a, 602b may provide relative positions of the tracked object or person 604 (e.g., the user) and/or one or more objects 606, 608 within the environment (e.g., movable objects 608 and/or stationary objects 608) in either a two-dimensional (2D) space (as illustrated) or a three-dimensional (3D) space. The objects 606, 608 may be identified and/or stored via the detector library 308, which is discussed above. In some examples, such as shown in FIG. 6a, the map 602a may employ a pre-generated map of an area (e.g., showing known streets, buildings, etc.) as a starting point, such as those maps provided by a third-party mapping service using GPS, RF, and/or cellular communication systems. In such an example, the object-tracking system 100 may update the pre-generated map to include information (e.g., location, details of the object, etc.) relating to the tracked object or person 604 and/or one or more tracked objects 606, 608, thereby resulting in the map 602a. The map 602a may be updated based at least in part on the last known position of the tracked object or person 604 and/or one or more tracked objects 606. With reference to FIG. 6b, another form of map 602b may be generated by the object-tracking system 100 whereby the one or more objects 606 at categorized as a function of distance (e.g., Near, Intermediate, or Far). In certain aspects, regardless of format, the maps 602a, 602b may be generated using data from multiple sensors (e.g., multiple cameras 104), which may be part of a single object-tracking system 100 or multiple object-tracking systems 100, which may be operatively coupled with one another via one or more networks, such as communication network 118.

It can be appreciated that aspects of the present disclosure may be implemented by hardware, software and/or a combination thereof. The software may be stored in a non-transitory machine-readable (e.g., computer-readable) storage medium, for example, an erasable or re-writable Read Only Memory (ROM), a memory, for example, a Random Access Memory (RAM, a memory chip, a memory device, or a memory Integrated Circuit (IC), or an optically or magnetically recordable non-transitory machine-readable, e.g., computer-readable, storage medium, e.g., a Compact Disk (CD), a Digital Versatile Disk (DVD), a magnetic disk, or a magnetic tape.

While the present method and/or system has been described with reference to certain implementations, it will be understood by those skilled in the art that various changes may be made and equivalents may be substituted without departing from the scope of the present method and/or system. In addition, many modifications may be made to adapt a particular situation or material to the teachings of the present disclosure without departing from its scope. For example, systems, blocks, and/or other components of disclosed examples may be combined, divided, re-arranged, and/or otherwise modified. Therefore, the present method and/or system are not limited to the particular implementations disclosed. Instead, the present method and/or system will include all implementations falling within the scope of the appended claims, both literally and under the doctrine of equivalents.

What is claimed is:

1. An object-tracking system comprising:
   a camera configured to capture an image of a surrounding environment in accordance with a first camera configuration, wherein the camera is moveable within a local environment and configured to adopt a second camera configuration;
   an inertial measurement unit (IMU) associated with the camera, wherein the IMU is configured to generate inertial data representing at least one of an angular velocity or linear acceleration of the camera; and
   a computer that is operatively coupled with the camera and the inertial measurement unit (IMU), wherein the computer is configured to:
   process the image from the camera by a graphical processing unit (GPU), wherein the GPU is configured to use feature extraction to process the image, and wherein the GPU is configured to provide an object detector with a preprocessed image,
   detect a moveable object within the image using a bounding box and a detection algorithm, wherein the detection algorithm is selected from a library of object detection algorithms, and wherein the selection is based on a type of object being detected and the surrounding environment,
   estimate a current position of the moveable object,
   estimate a current position of the camera relative to the current position of the moveable object using the inertial data,
   predict a future position of the moveable object,
   determine the second camera configuration based at least in part on the future position of the moveable object,
   determine a position of the camera within the local environment, and
   generate a real-time map of the local environment in a GPS-denied environment, wherein the real-time map reflects the current position of the moveable object and the current position of the camera relative to the moveable object.

2. The object-tracking system of claim 1, wherein the camera is coupled to or integrated with a wearable that is associated with a user of the object-tracking system.

3. The object-tracking system of claim 1, wherein at least one of the current position of the moveable object, the current position of the camera, or the future position of the moveable object is determined using a Kalman filter.

4. The object-tracking system of claim 1, wherein the computer is operatively coupled with a global positioning system (GPS), wherein the computer is configured to determine the current position of the camera relative to the moveable object using the GPS system in a non-GPS-denied environment.

5. A positioning system, comprising:
a camera, wherein the camera is oriented in accordance with a current pan, tilt, and/or zoom (PTZ) configuration, and wherein the camera is configured to capture an image while oriented in accordance with the current PTZ configuration;
a processor configured to process the image using a computer vision technique via a graphical processing unit (GPU), wherein the GPU is configured to use feature extraction to process the image, and wherein the GPU is configured to provide an object detector with a preprocessed image;
a controller configured to receive a current PTZ configuration from the camera, develop a new PTZ configuration, and communicate the new PTZ configuration to the camera;
a detector configured to detect a moveable object within the image, wherein the moveable object is detected using a bounding box and a detection algorithm selected from a library of object detection algorithms, wherein the selection is based on a type of object being detected and a surrounding environment, and wherein the detector is configured to deactivate a detection algorithm if it is no longer compatible with the type of object being detected; and
a state estimator configured to store a current estimated position of a user and calculate a new estimated position of the user based on the type of object, an estimated location of the moveable object, and a stored map of an environment, wherein the stored map includes the estimated location of the moveable object relative to the current estimated position, wherein the state estimator is trained to calculate the new estimated position through machine learning by artificial neural networks.

6. The positioning system of claim 5, wherein the camera is coupled to or integrated with a wearable that is associated with the user.

7. The positioning system of claim 5, wherein the controller develops a new PTZ configuration at least partly based on at least one of: the type of object being detected, the new estimated position of the user, or information shared by an external device.

8. The positioning system of claim 5, wherein the camera is an omnidirectional camera.

9. The positioning system of claim 5, further comprising a second camera configured to capture an image.

10. The positioning system of claim 5, further comprising an inertial measurement unit (IMU).

11. The positioning system of claim 5, wherein the state estimator uses odometry, at least in part, to calculate a new estimated position of the user.

12. The positioning system of claim 5, wherein the state estimator uses a Kalman filter.

13. The positioning system of claim 5, further comprising an interface configured to receive user input, wherein the input is used to help determine the type of object being detected.

14. A method for visually localizing an individual, the method comprising the steps of:
capturing an image containing an object via a camera using a first pan, tilt, and/or zoom (PTZ) configuration, wherein the camera is associated with the individual and moveable within a local environment;
processing the image to determine an appropriate detection algorithm based on a characteristic of the object and a surrounding environment;
selecting the appropriate detection algorithm from a library of detection algorithms;
detecting the object within the image using the detection algorithm, wherein the detection algorithm circumscribes the object with a bounding box, wherein the detection algorithm is selected from a library of object detection algorithms, and wherein the selection is based on a type of object being detected and the surrounding environment;
determining whether the object is moving or stationary;
in response to determining the object is stationary:
estimating a position of the object in relation to one of a user or other objects, wherein the position is estimated using a Kalman filter and inertial measurements from an inertial measurement unit (IMU), and storing the position of the object in a map memory;
determining a second PTZ configuration; and
orientating the camera in accordance with the second PTZ configuration; and
generating a real-time map of the local environment in a GPS-denied environment, wherein the real-time map reflects a current position of the camera and the position of the object.

15. The method of claim 14, wherein computer vision is used in at least one of the steps of: processing the image, selecting the appropriate detection algorithm, detecting an object within the image, and determining whether the object is moving or stationary.

16. The method of claim 14, wherein the camera comprises a plurality of cameras that have omnidirectional coverage between them.

17. The method of claim 14, further comprising the step of sharing at least one of estimated position and/or map information with an external device.

18. The object-tracking system of claim 1, wherein the computer is configured to perform, in conjunction with the camera and IMU, simultaneous localization and mapping (SLAM).

19. The object-tracking system of claim 1, wherein the computer is trained to track the moveable object through machine learning by artificial neural networks.

20. The object-tracking system of claim 1, wherein the camera is coupled to or integrated with a first vehicle and the moveable object is a second vehicle.

* * * * *